US012606430B2

(12) United States Patent
Lauro

(10) Patent No.: US 12,606,430 B2
(45) Date of Patent: Apr. 21, 2026

(54) RETRACTABLE SODA GUN SYSTEM

(71) Applicant: RiteVenturesNV LLC, Las Vegas, NV (US)

(72) Inventor: Livio Lauro, Las Vegas, NV (US)

(73) Assignee: RiteVenturesNV LLC, Las Vegas, NV (US)

( * ) Notice: Subject to any disclaimer, the term of this patent is extended or adjusted under 35 U.S.C. 154(b) by 168 days.

(21) Appl. No.: 18/735,871

(22) Filed: Jun. 6, 2024

(65) Prior Publication Data

US 2025/0206589 A1 Jun. 26, 2025

Related U.S. Application Data

(60) Provisional application No. 63/613,649, filed on Dec. 21, 2023.

(51) Int. Cl.
*B67D 1/00* (2006.01)
*B67D 1/08* (2006.01)

(52) U.S. Cl.
CPC ......... *B67D 1/0042* (2013.01); *B67D 1/0889* (2013.01); *B67D 2210/00031* (2013.01); *B67D 2210/00049* (2013.01)

(58) Field of Classification Search
CPC ................ B67D 1/0042; B67D 1/0889; B67D 2210/00031; B67D 2210/00049
See application file for complete search history.

(56) References Cited

U.S. PATENT DOCUMENTS

| | | | | |
|---|---|---|---|---|
| 5,152,429 A * | 10/1992 | Billings | B67D 1/10 | 222/144.5 |
| 2009/0084817 A1* | 4/2009 | Schroeder | B67D 1/0084 | 222/144.5 |
| 2013/0277394 A1* | 10/2013 | Edwards | B67D 1/0891 | 222/144.5 |
| 2015/0014481 A1* | 1/2015 | Vandewall | B64D 11/0007 | 244/118.5 |
| 2021/0276855 A1* | 9/2021 | Arora | B62B 5/0026 | |

OTHER PUBLICATIONS

Livio Lauro, Screen Captures from Youtube video Clip entitled "Eurobar Soda Gun Install," 3 pages, uploaded Jun. 5, 2025 by user "EuroBar". Retreived from on internet: <https://youtu.be/BcQn6wVZctl> [retreived on Dec. 17, 2025].*

* cited by examiner

*Primary Examiner* — Jeremy Carroll
(74) *Attorney, Agent, or Firm* — Workman Nydegger

(57) ABSTRACT

A soda gun housing may include (i) a plurality of enclosure walls defining an internal space; (ii) a manifold support connected to at least one wall of the plurality of enclosure walls and that is configured to secure a soda gun manifold; (iii) a retraction component anchor connected to a part of the plurality of enclosure walls and that is configured to secure a retraction component to the part of the plurality of enclosure walls, wherein the retraction component is connectable to a hose clamp configured to clamp onto a soda gun hose extending from the soda gun manifold secured by the manifold support; and (iv) a hose opening positioned on a wall of the plurality of enclosure walls and that permits the soda gun hose to extend from the internal space to an exterior of the soda gun housing.

20 Claims, 8 Drawing Sheets

RETRACTABLE SODA GUN SYSTEM

CROSS-REFERENCE TO RELATED APPLICATIONS

This application claims priority to U.S. Provisional Patent Application No. 63/613,649, filed on Dec. 21, 2023, and entitled "RETRACTABLE SODA GUN", the entirety of which is incorporated herein by reference for all purposes.

BACKGROUND

Bar guns, also known as soda guns, are intricate dispensing systems designed to streamline and simplify the process of serving beverages in bars and other hospitality settings. Soda guns typically include a handheld dispenser (or "handle") and a network of tubing connected to various reservoirs containing different liquids, such as sodas, juices, mixers, and even spirits. Soda gun operation usually involves a combination of mechanical and pneumatic components. A soda gun handle often includes multiple buttons or triggers, and each button or trigger corresponds to a specific beverage. When pressed, each button or trigger activates a valve mechanism within a dispenser. The activation of the valve releases a controlled flow of the chosen liquid through the tubing and out of the dispensing nozzle of the handle. The tubing system is connected to the respective containers or bag-in-box systems containing the beverages. Pumps or pressure systems, often utilizing carbon dioxide ($CO2$) for carbonated drinks, maintain a consistent pressure within the tubing to ensure a steady and precise dispensing of liquids in response to operation of the soda gun handle.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

DETAILED DESCRIPTION

Figure 1:
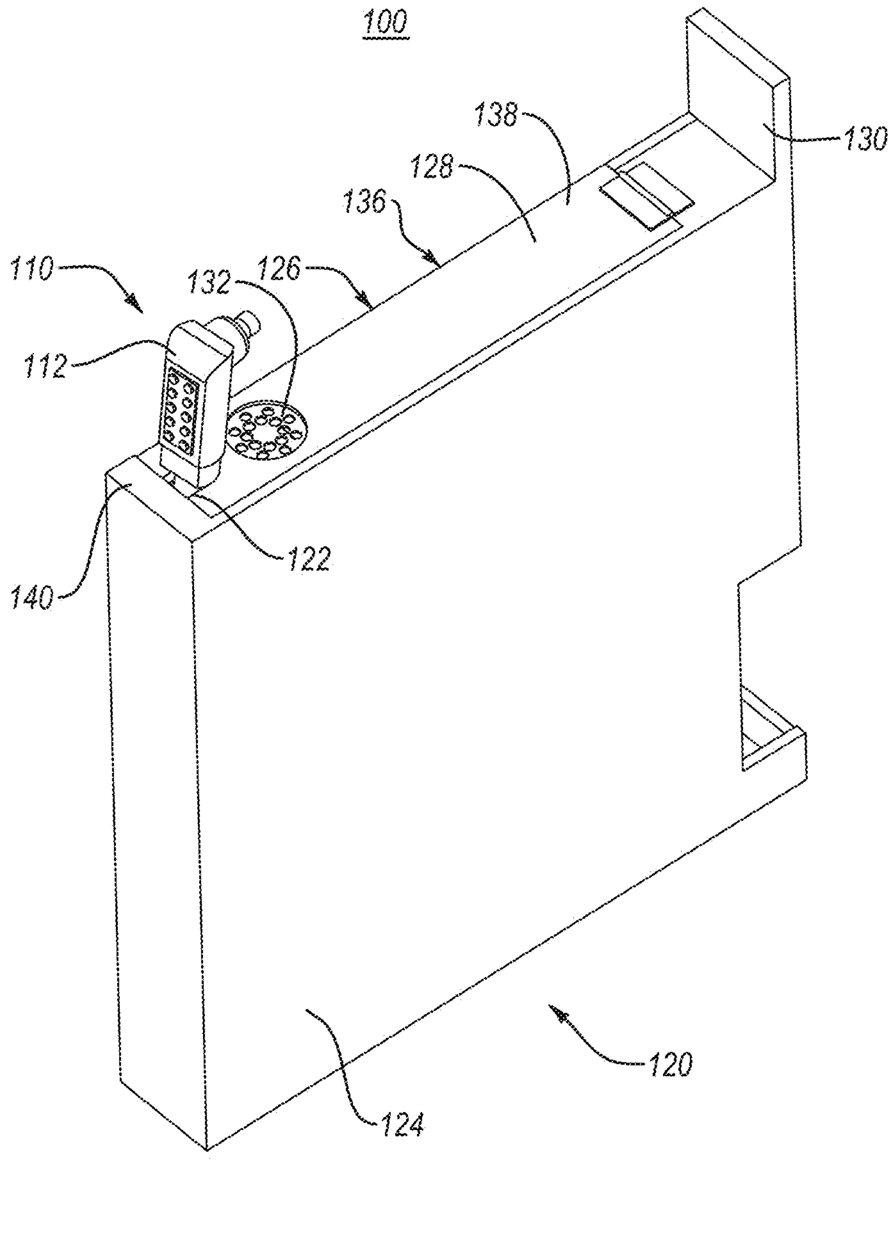
FIG. 1 illustrates a retractable soda gun system with the soda gun handle in a retracted configuration.

Disclosed embodiments are directed to retractable soda gun systems and components thereof.

As noted above, a soda gun typically includes a handle and a network of tubing connected to various reservoirs containing different liquids. A soda gun handle is usually connected to the end of a hose that extends from a manifold. The manifold is connected to multiple fluid lines that extend to multiple fluid sources. The manifold serves as a distribution system that manages the flow of the different liquids to the dispensing portion of the handle in response to operation of the handle. For instance, the handle can include multiple buttons or triggers associated with different fluid sources, and operation of the buttons or triggers can cause the manifold to dispense the corresponding liquid in accordance with flow settings.

Although soda guns can facilitate quick and/or accurate service of beverages in various establishments, soda gun use and/or management is associated with various challenges. For instance, existing soda gun systems can be cumbersome to store and/or operate, with the hose that extends from the manifold to the handle often interfering with or obstructing access to surrounding items.

At least some disclosed embodiments are directed to a retractable soda gun housing that can facilitate retraction and extension of the soda gun handle and hose. In one example, the soda gun housing includes enclosure walls that define an internal space. The soda gun housing further includes a manifold support that is connected to one or more of the enclosure walls. The manifold support secures the manifold of the soda gun to enable the liquid lines to connect to the manifold, while preventing the liquid lines from interfering with the retraction/extension of the main hose extending from the manifold toward the handle.

Continuing with the foregoing example, the soda gun housing further includes a retraction component anchor that secures a retraction component (such as a tool retractor or an extension spring). When secured by the retraction component anchor, the retraction component connects to a hose clamp, which secures to the main soda gun hose that extends from the manifold. The main soda gun hose extends from the manifold through the internal space of the soda gun housing and through a hose opening on a wall of the soda gun housing. The soda gun handle can thus reside outside of the soda gun housing.

Under such a configuration, a user can grip the soda gun handle resting outside of the soda gun housing and apply slight pulling force to bring the soda gun handle to a desired position for operation and drink dispensing. The retraction component can extend in response to the user force to permit soda gun hose to advance through the hose opening of the soda gun housing to achieve the extended configuration. When in the extended configuration, the retraction component can be adapted to apply sufficiently weak force to the soda gun hose to prevent the user from having to focus on counteracting the retraction force to maintain the operating position of the soda gun handle.

When dispensing/use is complete, the user may bring the soda gun handle back toward the hose opening of the soda gun housing. As the user closes the distance between the soda gun handle and the hose opening, the retraction component may retract within the soda gun housing, drawing the soda gun hose to its original position within the soda gun housing. During retraction, the retraction component may bring the soda gun hose into contact with one or more hose supports within the soda gun housing. The hose support(s) may define the rest or retracted configuration of the soda gun hose within the soda gun housing, contributing to operational consistency. Alternatively, a soda gun housing may omit hose supports.

The soda gun hose may traverse a hose travel space within the soda gun housing when changing between extended and retracted configurations. The soda gun hose may occupy a lower part of the hose travel space when in the retracted configuration, and the soda gun hose may occupy a higher part of the hose travel space when in the extended configuration. Retraction of the soda gun hose from the extended configuration to the retracted configuration may thus be assisted by gravity, which can enable utilization of a weak retraction component so as not to disturb user operation in the extended configuration.

A soda gun housing as described herein may comprise a small form factor, such as having a width that is four inches or less. Such a configuration can enable a soda gun housing, as described herein, to be implemented in beverage service establishments in a space-efficient manner (e.g., enabling the soda gun housing to be positioned between other non-movable units). Furthermore, the soda gun housing may include a drainage catch positioned proximate to the soda gun handle when in the retracted configuration, which can enable management of drippage from the soda gun nozzle.

Having just described some of the high-level features and/or advantages associated with the disclosed embodiments, attention will now be directed to FIGS. 1 through 6, which provide supporting illustrations for describing the disclosed embodiments.

Figure 2:
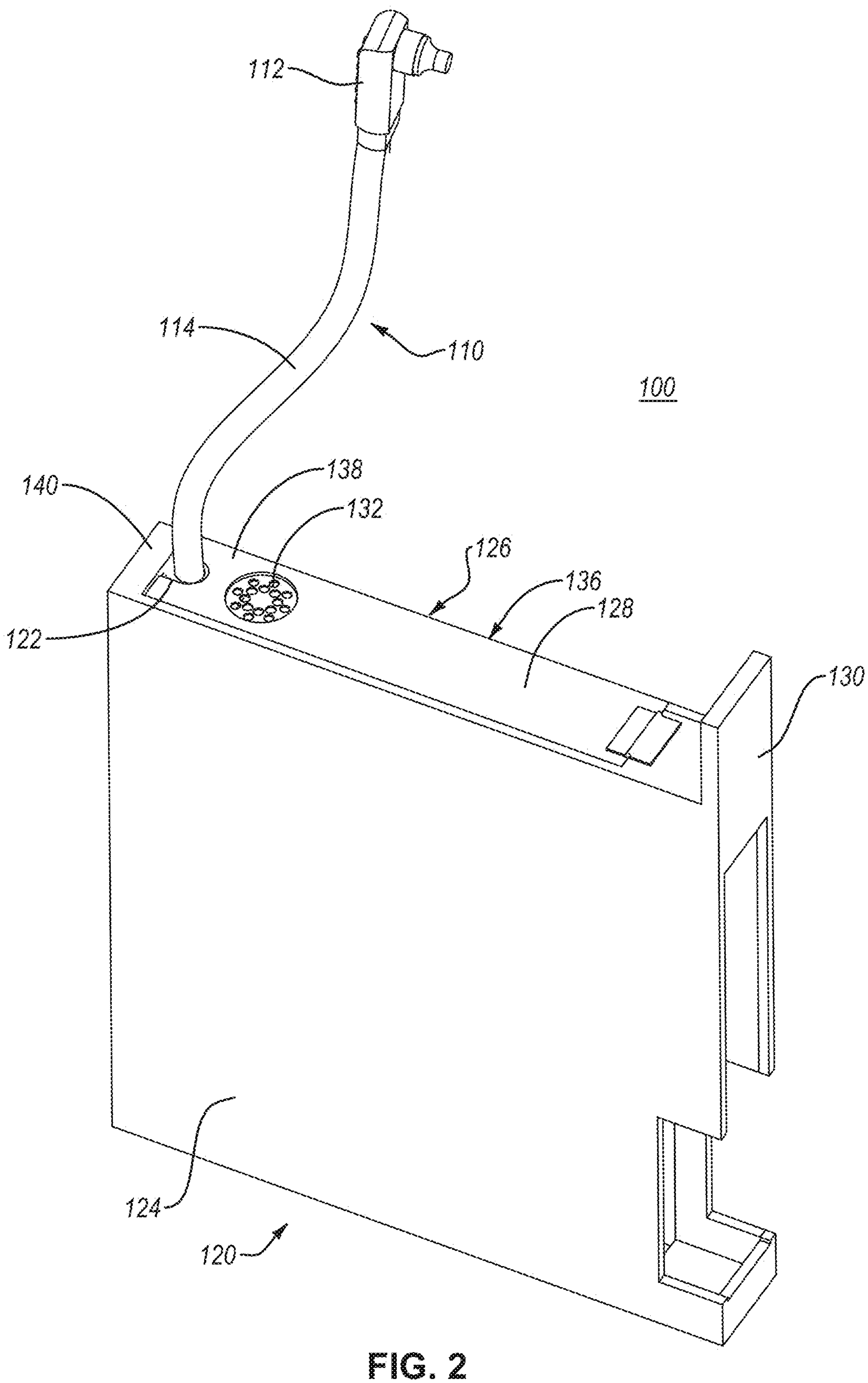
FIG. 2 illustrates the retractable soda gun system of FIG. 1 with the soda gun handle in an extended configuration.

FIG. 1 illustrates a retractable soda gun system 100 in a retracted configuration, and FIG. 2 illustrates the retractable soda gun system 100 in an extended configuration. The retractable soda gun system 100 of FIGS. 1 and 2 includes various components. For instance, the retractable soda gun system 100 includes a soda gun assembly 110 and a soda gun housing 120. The soda gun assembly 110 includes a soda gun handle 112, a soda gun hose 114 (see FIG. 2), and a soda gun manifold 116 (see FIG. 3). The soda gun manifold 116 is housed within the soda gun housing 120, as will be described in more detail with reference to FIG. 3. The soda gun hose 114 extends from the soda gun manifold 116 through the interior of the soda gun housing 120 and through a hose opening 122 in the soda gun housing 120 (see FIG. 2). The soda gun handle 112 is connected to the end of the soda gun hose 114. As noted above, the soda gun handle 112 can include a dispensing nozzle and various buttons or triggers to facilitate dispensing of various beverages from the dispensing nozzle.

As noted above, FIG. 1 shows the retractable soda gun system 100 in a retracted configuration, in which the soda gun handle 112 is positioned proximate to the hose opening 122 of the soda gun housing 120 and in which the soda gun hose 114 is retracted into the soda gun housing 120. FIG. 2 shows the retractable soda gun system 100 in an extended configuration, in which the soda gun handle 112 is distanced from the hose opening 122 of the soda gun housing 120 and in which the soda gun hose 114 is advanced through the hose opening 122. The soda gun housing 120 houses various internal components that facilitate the extension and retraction of the soda gun hose 114, which will be described in more detail with reference to FIGS. 3-5.

As shown in FIGS. 1 and 2, the soda gun housing 120 includes a plurality of enclosure walls, including a first sidewall 124, a second sidewall 126, and a top wall 128. In the example of FIGS. 1 and 2, the soda gun housing 120 includes a backsplash element 130 extending therefrom, which can prevent fluids dispensed from the soda gun handle 112 from reaching or damaging walls, cabinetry, or other objects against which the soda gun housing 120 may be installed.

In the example of FIGS. 1 and 2, the hose opening 122 of the soda gun housing 120 is positioned on the top wall 128 of the soda gun housing 120. The hose opening 122 can be sized to accommodate passage of the soda gun hose 114 therethrough (e.g., while preventing the soda gun handle 112 from retracting through the hose opening 122 into the internal space of the soda gun housing 120).

FIGS. 1 and 2 furthermore demonstrate that the soda gun housing 120 can include a drainage opening 132 positioned proximate to the hose opening 122 (e.g., on the top wall 128). The drainage opening 132 can thus collect drippage from the soda gun handle 112 when the soda gun handle 112 is in the retracted configuration (shown in FIG. 1). In some instances, a drainage opening 132 can include a drip collection element or sink positioned thereover (not shown). As will be described in more detail hereinafter, the soda gun housing 120 may comprise additional components within the internal space for managing drippage collected via the drainage opening 132 and/or drip collection element.

One will appreciate, in view of the present disclosure, that the positioning of the soda gun handle 112 in the retracted configuration as shown in FIG. 1 is provided by way of example only and is not limiting of the principles described herein. For instance, when in the retracted configuration, the soda gun handle 112 may be oriented with its dispensing nozzle facing toward the top wall 128 (with a greater length of the soda gun hose 114 extending through the hose opening 122), and the drainage opening 132 may be positioned on the top wall 128 further from the hose opening 122 to catch drippage from the dispensing nozzle. Other configurations are possible.

The soda gun housing 120 may include doors that are openable to expose the internal space of the soda gun housing 120. In the example of FIGS. 1 and 2, the second sidewall 126 includes a side door 136, and the top wall 128 includes a top door 138. The hose opening 122 may be defined by an edge of the top door 138 and a support plate 140 of the top wall 128, as shown in FIG. 2. Stated differently, the hose opening 122 may be formed as a notch in the top door 138 of the top wall 128 of the soda gun housing 120. Such a configuration can improve ease of installation, reconfiguration, maintenance, inspection, cleaning, etc. For instance, a user may open the side door 136 and the top door 138 to connect the soda gun manifold 116 and soda gun hose 114 to componentry in the internal space of the soda gun housing 120, extend the hose through the open top door 138 of the soda gun housing 120, close the side door 136, and close the notch of the top door 138 that forms the hose opening 122 about the soda gun hose 114, making the retractable soda gun system 100 ready for extension and retraction of the soda gun handle 112 and soda gun hose 114.

Figure 3:
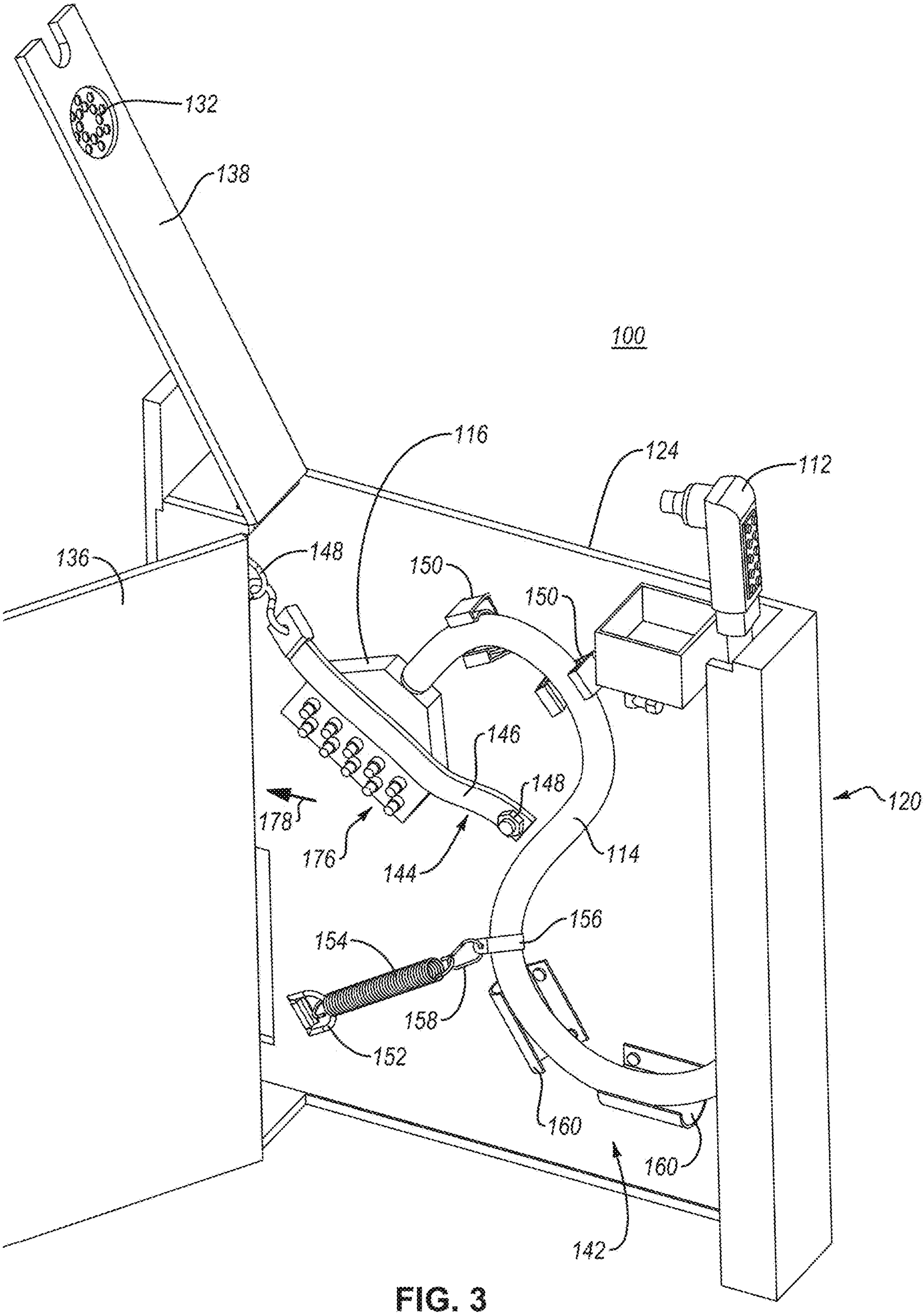
FIG. 3 illustrates a retractable soda gun system with the soda gun handle in the retracted configuration and with enclosure walls of the soda gun housing opened to expose interior components.

FIG. 3 illustrates the retractable soda gun system 100 with the side door 136 and the top door 138 opened to expose the internal space 142 of the soda gun housing 120. FIG. 3 illustrates the soda gun manifold 116 with the soda gun hose 114 extending therefrom toward the soda gun handle 112. As shown in FIG. 3, the soda gun manifold 116 is connected to the first sidewall 124 of the soda gun housing 120 via a manifold support 144. The manifold support 144 can include various elements to facilitate connection of the soda gun manifold 116 to the first sidewall 124. In the example of FIG. 3, the manifold support 144 includes a manifold strap 146 anchored by strap anchors 148 to secure the soda gun manifold 116 against the first sidewall 124. The manifold support 144 can also include one or more studs (not shown) affixed to the first sidewall 124 and extending into the internal space 142 of the soda gun housing 120. The stud(s)

may extend into one or more corresponding holes of the soda gun manifold 116, and the combination of the stud(s) and the manifold strap 146 may stably secure the soda gun manifold 116 to the first sidewall 124. A manifold support 144 may comprise additional or alternative types of connection elements to secure the soda gun manifold 116 to the soda gun housing 120 such as brackets, clips, screws/anchors, adhesives, magnetic mounts, rail systems, mounting plates, fasteners, cleats, rotating mounts, cantilever mounts, and/or others.

FIG. 3 shows the soda gun manifold 116 mounted to the first sidewall 124 via the manifold support 144, with the soda gun hose 114 extending from the mounted soda gun manifold 116. In the example of FIG. 3, the soda gun housing 120 further includes hose clips 150 connected to the first sidewall 124. The hose clips 150 of FIG. 3 secure the soda gun hose 114 to the first sidewall 124 and can control the travel of the soda gun hose 114 within the internal space 142 of the soda gun housing 120 when changing between extended configurations and retracted configurations. The hose clips 150 can additionally prevent torquing of the soda gun hose 114 at the region where the soda gun hose 114 connects to the soda gun manifold 116, which can improve the longevity of the system. One will appreciate, in view of the present disclosure, that the quantity and form of the hose clips 150 in FIG. 3 is provided by way of example only, and other types of mechanisms for securing the soda gun hose 114 to the first sidewall 124 may be implemented (e.g., straps, clamps, ties, slots/channels, etc.).

The soda gun housing 120 of FIG. 3 furthermore includes an extension spring anchor 152 affixed to the first sidewall 124. The extension spring anchor 152 secures an end of an extension spring 154 to the first sidewall 124, and the other end of the extension spring 154 connects to a hose clamp 156. The hose clamp 156, as shown in FIG. 3, is clamped to the soda gun hose 114, enabling force interactions between the extension spring 154 and the soda gun hose 114. The hose clamp 156 can include any member/element adapted to fixedly secure to the soda gun hose 114 to maintain connection between the extension spring 154 and the soda gun hose 114 as the soda gun hose 114 is handled by users (e.g., to extend and retract). In the example of FIG. 3, a spring couple 158 (e.g., implemented as a spring clip) is pivotally connected to the hose clamp 156 and intervenes between the hose clamp 156 and the extension spring 154. The pivot connection between the spring couple 158 and the hose clamp 156 can reduce wear on the contact portion of the extension spring 154 as the soda gun hose 114 is drawn between extended and retracted configurations.

Figure 8:
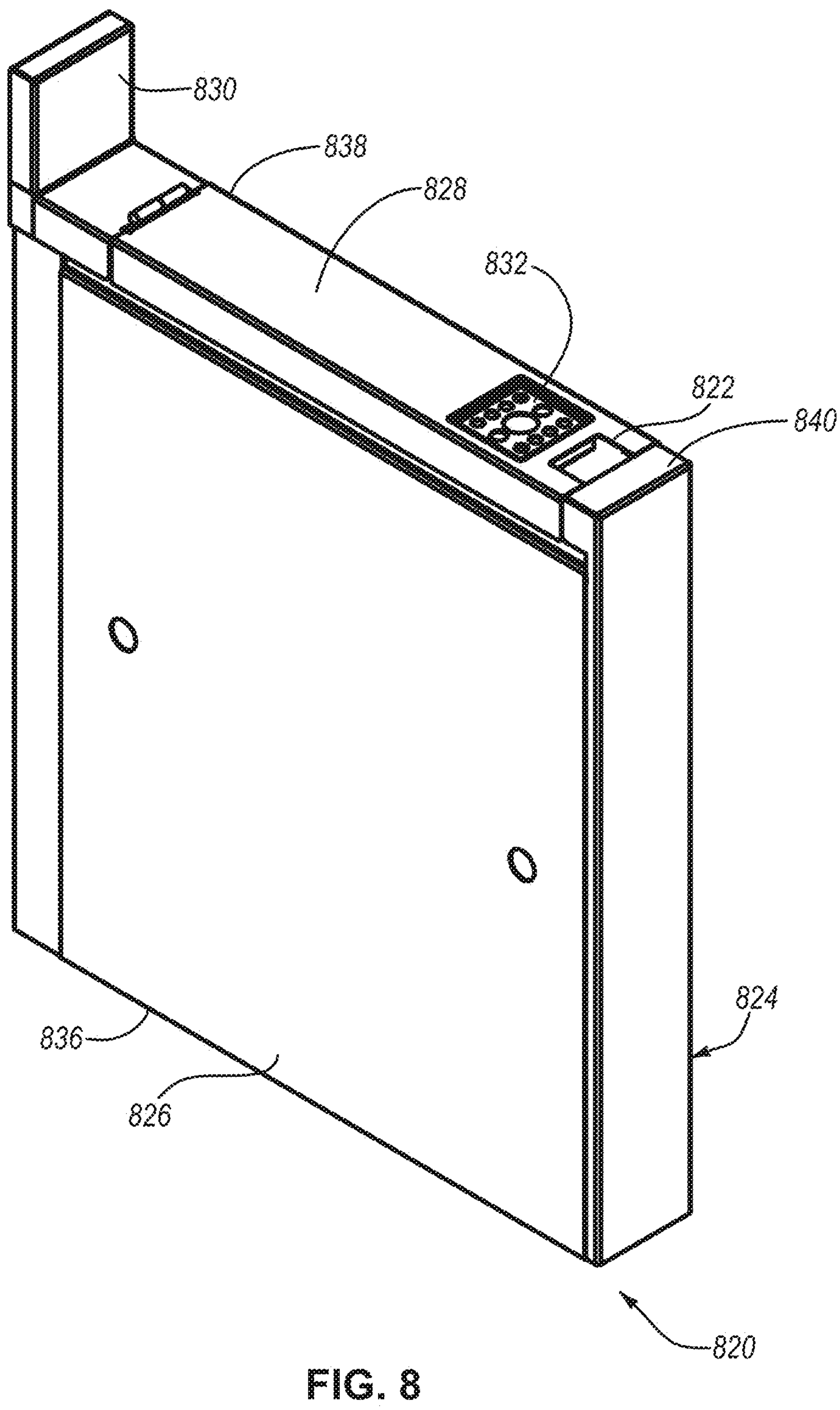
FIGS. 8 and 9 illustrate an alternative embodiment of a soda gun housing that implements a tool retractor.
Figure 9:
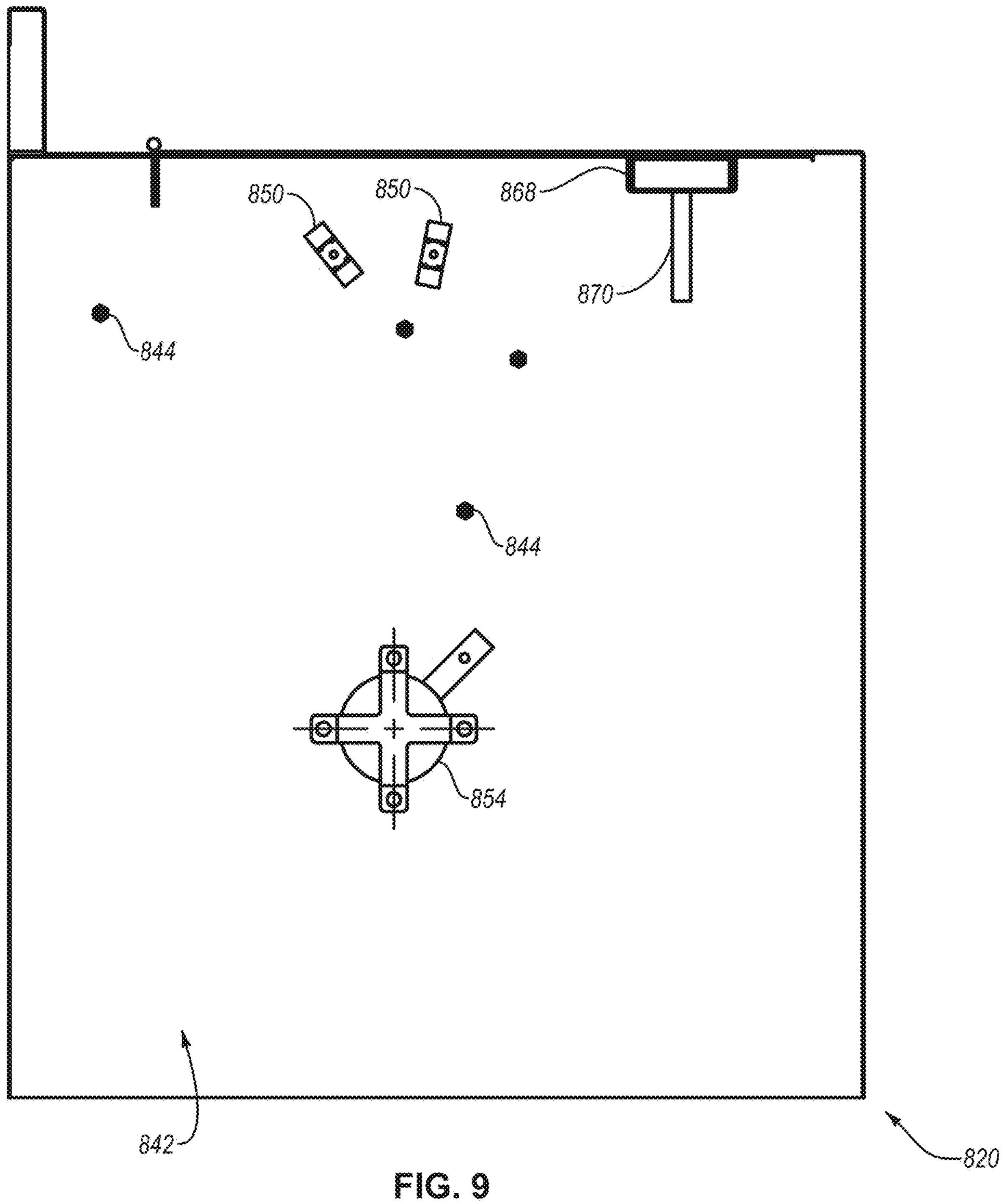

Although the example shown in FIG. 3 implements an extension spring 154, other types of retraction components may be used, an example of which is shown and described with reference to FIGS. 8 and 9.

In the example of FIG. 3, the soda gun housing 120 further includes hose supports 160 connected to the soda gun housing 120. FIG. 3 illustrates two hose supports 160 connected to the first sidewall 124 of the soda gun housing 120. The hose supports 160 are configured to support the soda gun hose 114 in the retracted position. For instance, the hose supports 160 of FIG. 3 are implemented as pipe sections (e.g., half pipes) configured to cradle the soda gun hose 114 when in the retracted configuration. However, other quantities, configurations, and/or positionings of hose supports may be implemented. The hose supports 160 can define a final positioning of the soda gun hose 114 for the retracted configuration, which can contribute to consistent hose retraction functionality. In some instances, the extension spring 154 is configured to draw the soda gun hose 114 into contact or proximity with the hose supports 160 to achieve the retracted configuration.

Figure 4:
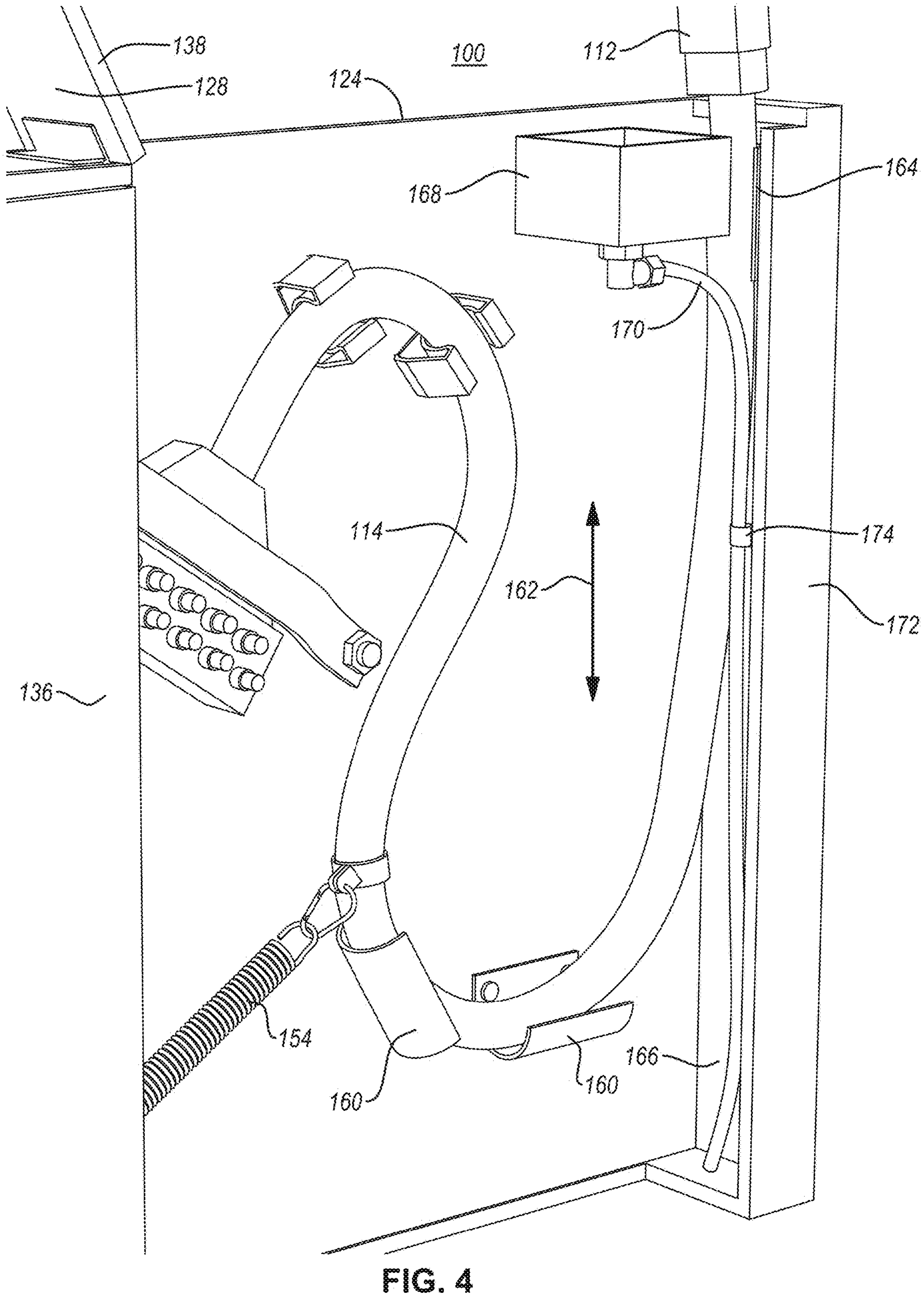
FIG. 4 illustrates another view of the retractable soda gun system of FIG. 3 with the top enclosure wall closed.

FIG. 4 illustrates another view of the retractable soda gun system 100 with the side door 136 and the top door 138 still open. FIG. 4 shows the retracted configuration of the retractable soda gun system 100 in which the extension spring 154 is retracted to pull the soda gun hose 114 (and the soda gun handle 112) into a retracted position. As shown in FIG. 4, when in the retracted position, the soda gun hose 114 is engaged with or proximate to the hose supports 160.

Figure 5:
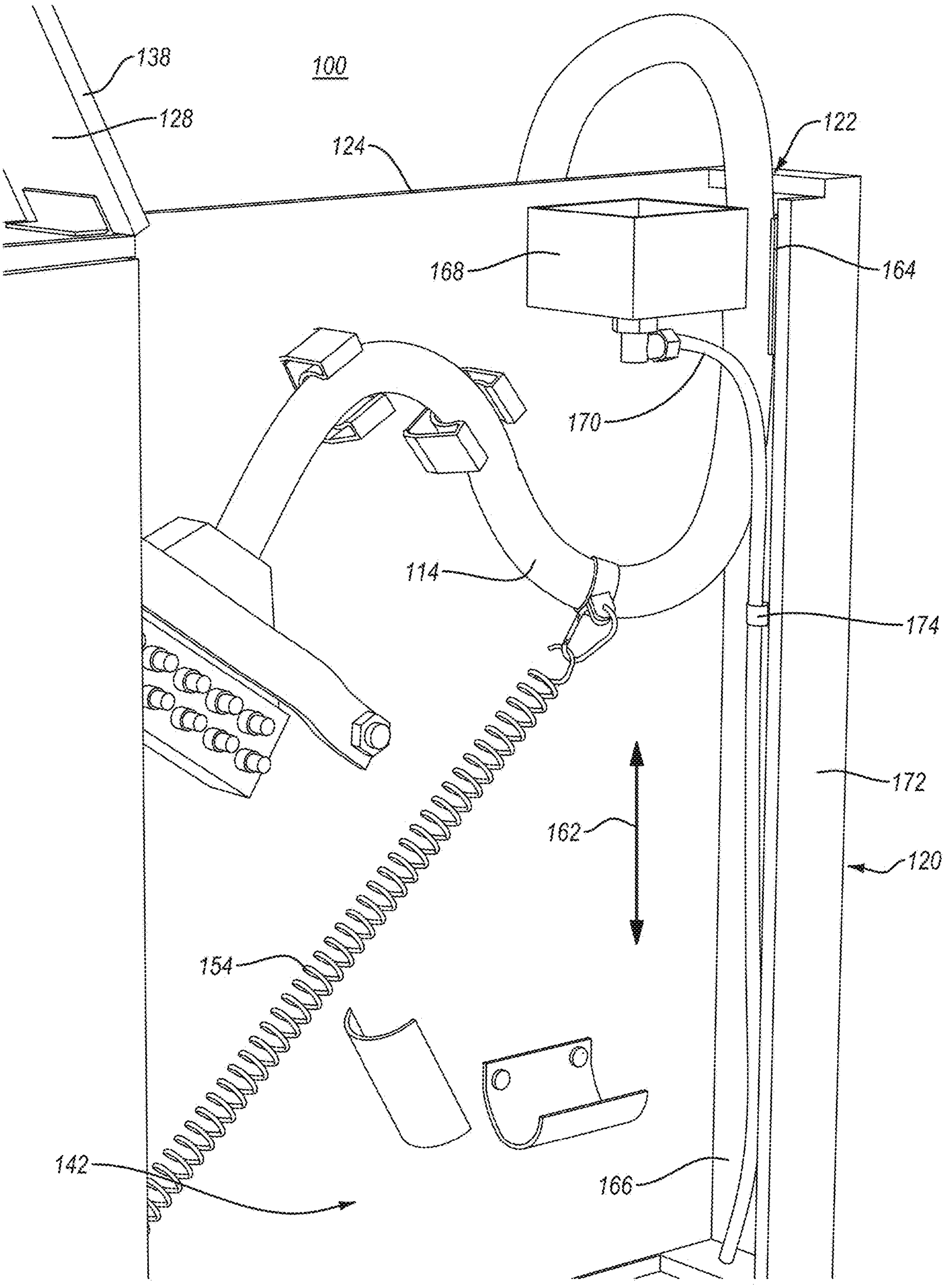
FIG. 5 illustrates the retractable soda gun system of FIG. 4 with the soda gun handle in the extended configuration.

FIG. 5 illustrates the retractable soda gun system 100 in the extended configuration, in which the extension spring 154 is extended to permit the soda gun hose 114 (and the soda gun handle 112) to extend further out of the soda gun housing 120 (relative to the retracted configuration) to enable the soda gun handle 112 to reach extended positions. For instance, a user may grip the soda gun handle 112 and pull the soda gun handle 112 into the extended configuration to enable the soda gun handle 112 to reach extended positions for beverage dispensing. The pulling on the soda gun handle 112 causes the extension spring 154 to extend, as shown in FIG. 5, and causes the soda gun hose 114 to traverse a hose travel space 162 within the internal space 142 of the soda gun housing 120.

When use of the soda gun handle 112 is complete, the user may bring the soda gun handle 112 back toward the hose opening 122 of the soda gun housing 120, which causes the extension spring 154 to retract, pulling the soda gun hose 114 into the retracted configuration shown in FIG. 4. As is evident from FIGS. 4 and 5, the soda gun hose 114 occupies a lower part of the hose travel space 162 when in the retracted configuration (relative to the part of the hose travel space 162 occupied by the soda gun hose 114 when in the extended configuration). Thus, the return of the soda gun hose 114 to the retracted configuration from the extended configuration can be assisted by gravity. Such an operational mode can permit use of a weak extension spring 154 while still achieving the desired extension/retraction functionality, which can prevent the extension spring 154 from unduly influencing user operation of the soda gun handle 112 when in the extended configuration.

FIGS. 4 and 5 also illustrates an additional hose support 164 connected to a front wall 166 of the soda gun housing 120. The additional hose support 164 can guide travel of the soda gun hose 114 through the hose opening 122 when transitioning from the retracted configuration to the extended configuration. For instance, the additional hose support 164 can mitigate catching of the soda gun hose 114 on edges of the soda gun housing 120 during withdrawal.

In the example of FIGS. 4 and 5, the soda gun housing 120 furthermore includes a drainage catch 168, which is fixed to the first sidewall 124 and configured to reside beneath the drainage opening 132 of the top wall 128 when the top door 138 is closed. The drainage catch 168 can be configured to catch drippage collected by the drip collection element (if present) and directed through the drainage opening 132. FIGS. 4 and 5 illustrate the drainage catch 168 as being connected to a drainage hose 170, which can direct the collected drippage to a waste/sewer system. As shown in FIGS. 4 and 5, the drainage hose 170 is secured to a support plate 172 of the second sidewall 126 via a drainage hose clamp 174. The drainage hose clamp 174 can prevent the drainage hose 170 from interfering with the soda gun hose 114 as the soda gun hose 114 traverses the hose travel space 162 to transition between extended and retracted configurations.

As noted above, FIG. 3 shows the soda gun manifold 116 secured to the first sidewall 124 via the manifold support 144. As illustrated, the manifold support 144 secures the soda gun manifold 116 to the first sidewall 124 with the fluid line ports 176 of the soda gun manifold 116 at least partially facing a rear 178 of the soda gun housing 120. Such a configuration can enable the fluid lines to connect to the soda gun manifold 116 in a manner that avoids the hose travel space 162 within the internal space 142 of the soda gun housing 120. The fluid lines can thus be prevented from interfering with extension and/or retraction of the soda gun hose 114.

Figure 6:
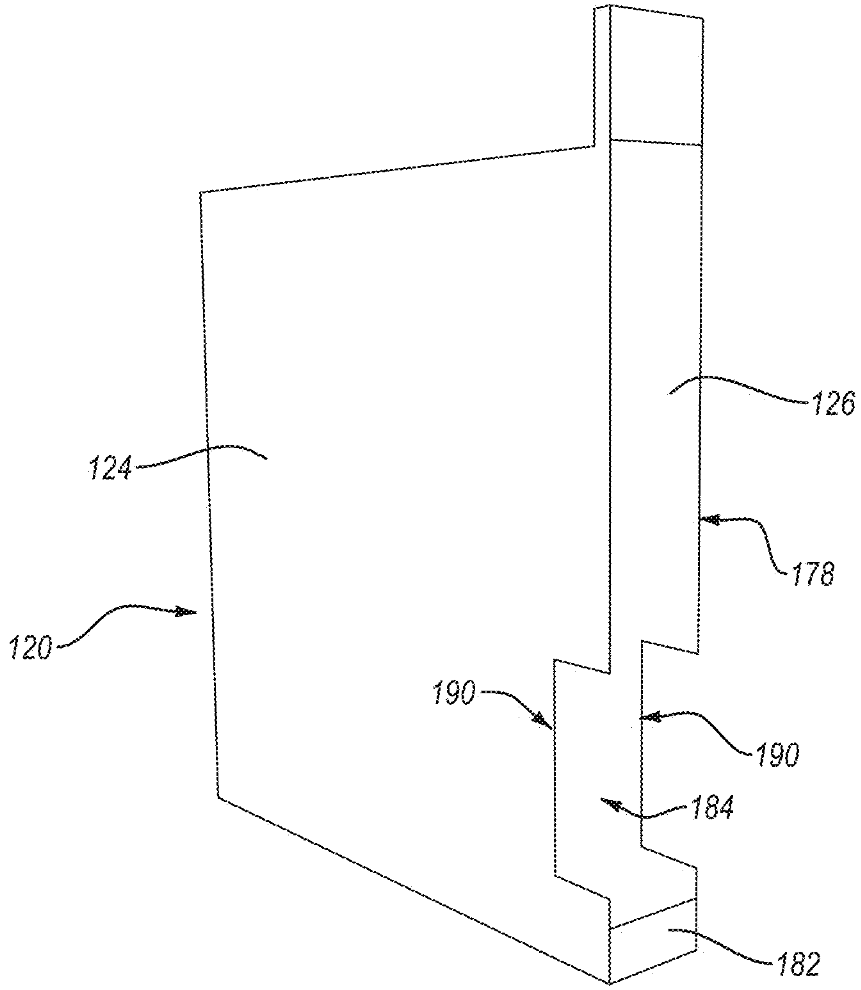
FIGS. 6 and 7 illustrate a rear and bottom portion of a retractable soda gun system.
Figure 7:
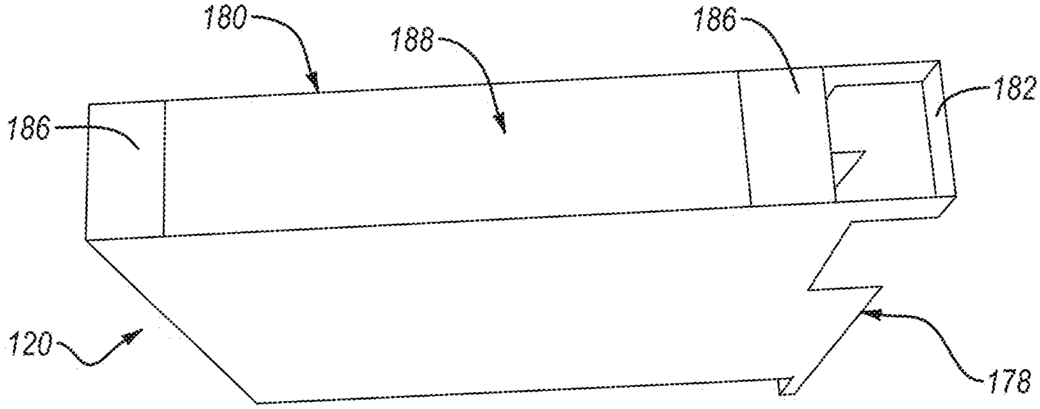

FIGS. 6 and 7 illustrate the rear 178 and a bottom 180 of the retractable soda gun system 100. In particular, FIG. 6 illustrates that the soda gun housing 120 includes a rear support 182, which defines a rear opening 184 of the soda gun housing 120. The rear opening 184 may furthermore comprise one or more notches 190 in the sides (e.g., in the first sidewall 124 and/or the second sidewall 126) to enable at least partially lateral entry of fluid lines into the rear opening. FIG. 7 also shows the soda gun housing 120 as including one or more bottom supports 186, which defines a bottom opening 188 of the soda gun housing 120. The fluid lines may be routed through the rear opening 184 and/or the bottom opening 188 to reach the soda gun manifold 116 secured within the soda gun housing 120, which can enable the majority of the fluid lines to reside outside of the soda gun housing 120 Such a configuration can reduce the chance of the fluid lines interfering with retraction/extension functionality of the retractable soda gun system 100.

A retractable soda gun system 100 as described herein may be provided as a single unit, with the soda gun assembly 110 integrated with the soda gun housing 120. In some instances, the soda gun housing 120 can be provided to users for use in conjunction with existing soda gun assemblies. A user may assemble a retractable soda gun system 100 using a soda gun assembly 110 and a soda gun housing 120 as described herein by following various steps. The steps need not be performed in any particular order, unless otherwise stated, or unless performance of one step is conditioned on completion of another.

A first step may comprise obtaining a soda gun assembly (110). the soda gun assembly (110) may comprise a soda gun manifold (116), a soda gun hose (114) extending from the soda gun manifold (116), and a soda gun handle (112) connected to an end of the soda gun hose (114).

A second step may comprise securing the soda gun manifold (116) to a manifold support (144) connected to at least one wall (e.g., first sidewall 124) of a plurality of enclosure walls of a soda gun housing (120).

A third step may comprise clamping a hose clamp (156) onto the soda gun hose (114). The hose clamp (156) is connected to a second end of an extension spring (154). A first end of the extension spring (154) is secured to an extension spring anchor (152) that is connected to a part (e.g., first sidewall 124) of the plurality of enclosure walls.

A fourth step may comprise extending the soda gun hose (114) through a hose opening (122) positioned on a wall (e.g., top wall 128) of the plurality of enclosure walls such that the soda gun hose (114) extends from an internal space (142) formed by the plurality of enclosure walls to an exterior of the soda gun housing (120), and such that the soda gun handle (112) is prevented from retracting through the hose opening (122) into the internal space (142).

Although the examples described herein have focused, in at least some respects, on affixation or connection of various elements to particular parts, enclosure walls, plates, etc. of the soda gun housing 120, additional or alternative connection points are within the scope of the present disclosure. Furthermore, one will appreciate, in view of the present disclosure, that the door configuration of the soda gun housing 120 may be varied in accordance with the disclosed principles (e.g., the orientation of the doors, and the enclosure walls that receive at least some components, may be mirrored). A soda gun housing 120 can include more or fewer doors than shown in the examples discussed herein. Other variations/deviations from the specific examples shown are within the scope of the present disclosure.

Although the examples discussed herein have focused, in at least some respects, on retractable soda gun systems that utilize an extension spring, other types of retraction components may be used. For example, FIGS. 8 and 9 illustrate an example soda gun housing 820 that includes features similar to the soda gun housing 120 described hereinabove, such as a hose opening 822, sidewalls 824, 826, 828, a backsplash element 830, a drainage opening 832, a side door 836, a top door 838, and a support plate 840 (as shown in FIG. 8). FIG. 9 illustrates a side cross-sectional view of the soda gun housing 820 and shows additional features thereof, including an internal space 842, studs 844 (with accompanying nuts) for securing manifold support and/or other components, hose clips 850, a drainage catch 868 (e.g., below the drainage opening 832), a drainage tube 870 (e.g., connectable to a drainage hose), and a tool retractor 854. The tool retractor 854 can perform a function similar to the extension spring 154 described hereinabove. For instance, the tool retractor 854 can be connected to a soda gun hose 114 (e.g., with an intervening spring couple 158) and can be retracted to pull the soda gun hose 114 into a retracted position and can be extended to permit the soda gun hose 114 to extend further out of the soda gun housing 820 (e.g., through the hose opening 822) to enable the soda gun handle 112 to reach extended positions.

Embodiments disclosed herein can include those in the following numbered clauses:

Clause 1. A soda gun housing, comprising: a plurality of enclosure walls defining an internal space; a manifold support connected to at least one wall of the plurality of enclosure walls, the manifold support being configured to secure a soda gun manifold to the at least one wall within the internal space; a retraction component anchor connected to a part of the plurality of enclosure walls, the retraction component anchor being configured to secure a retraction component to the part of the plurality of enclosure walls, wherein the retraction component is connectable to a hose clamp configured to clamp onto a soda gun hose extending from the soda gun manifold secured by the manifold support; and a hose opening positioned on a wall of the plurality of enclosure walls, wherein the hose opening permits the soda gun hose to extend from the internal space to an exterior of the soda gun housing.

Clause 2. The soda gun housing of clause 1, wherein the retraction component comprises a tool retractor or an extension spring.

Clause 3. The soda gun housing of clause 1, wherein the internal space comprises a hose travel space through which the soda gun hose is configured to travel when changing between extended and retracted configurations.

Clause 4. The soda gun housing of clause 1, further comprising one or more hose clips connected to at least part of the plurality of enclosure walls, the one or more hose clips being configured to secure the soda gun hose to at least the part of the plurality of enclosure walls.

Clause 5. The soda gun housing of clause 1, further comprising one or more hose supports connected to at least part of the plurality of enclosure walls, the one or more hose supports being configured to support the soda gun hose in a retracted configuration.

Clause 6. The soda gun housing of clause 1, wherein the plurality of enclosure walls comprises a first sidewall, a second sidewall, and a top wall.

Clause 7. The soda gun housing of clause 6, wherein the top wall comprises a top door that is openable to expose the internal space.

Clause 8. The soda gun housing of clause 6, wherein the soda gun housing comprises a backsplash element extending therefrom.

Clause 9. The soda gun housing of clause 7, wherein an edge of the top door at least partially defines the hose opening.

Clause 10. The soda gun housing of clause 6, wherein the first sidewall or the second sidewall comprises a side door that is openable to expose the internal space.

Clause 11. The soda gun housing of clause 6, wherein the plurality of enclosure walls further comprises one or more rear support walls and one or more bottom support walls, wherein the one or more rear support walls at least partially define a rear opening, and wherein the one or more bottom support walls at least partially define a bottom opening.

Clause 12. The soda gun housing of clause 1, further comprising a drainage opening positioned on the wall of the plurality of enclosure walls.

Clause 13. The soda gun housing of clause 12, further comprising a drainage hose clamp connected to at least part of the plurality of enclosure walls, the drainage hose clamp being configured to secure a drainage hose extending from a drainage catch to at least the part of the plurality of enclosure walls.

Clause 14. A retractable soda gun system, comprising: a soda gun assembly, comprising: a soda gun manifold; a soda gun hose extending from the soda gun manifold; and a soda gun handle connected to an end of the soda gun hose; and a soda gun housing, comprising: a plurality of enclosure walls defining an internal space; a manifold support connected to at least one wall of the plurality of enclosure walls, the manifold support securing the soda gun manifold to the at least one wall within the internal space; a retraction component anchor connected to a part of the plurality of enclosure walls, the retraction component anchor securing a retraction component to the part of the plurality of enclosure walls, wherein the retraction component is connected to the soda gun hose; and a hose opening positioned on a wall of the plurality of enclosure walls, wherein the soda gun hose extends from the internal space to an exterior of the soda gun housing through the hose opening.

Clause 15. The retractable soda gun system of clause 14, wherein the retraction component comprises a tool retractor or an extension spring.

Clause 16. The retractable soda gun system of clause 14, wherein the retractable soda gun system comprises: a retracted configuration in which the retraction component is retracted to pull the soda gun hose and the soda gun handle into a retracted position; and an extended configuration in which the retraction component is extended to permit the soda gun hose and the soda gun handle to reach one or more extended positions.

Clause 17. The retractable soda gun system of clause 16, wherein the internal space comprises a hose travel space through which the soda gun hose is configured to travel when changing between extended and retracted configurations.

Clause 18. The retractable soda gun system of clause 16, wherein the soda gun housing further comprises one or more hose supports connected to at least part of the plurality of enclosure walls, the one or more hose supports being configured to support the soda gun hose in the retracted configuration.

Clause 19. The retractable soda gun system of clause 14, wherein a spring couple intervenes between the retraction component and the soda gun hose.

Clause 20. A method for assembling a retractable soda gun system, the method comprising: obtaining a soda gun assembly, the soda gun assembly comprising: a soda gun manifold; a soda gun hose extending from the soda gun manifold; and a soda gun handle connected to an end of the soda gun hose; securing the soda gun manifold to a manifold support connected to at least one wall of a plurality of enclosure walls of a soda gun housing; clamping a hose clamp onto the soda gun hose, wherein the hose clamp is connected to a second end of an extension spring, wherein a first end of the extension spring is secured to an extension spring anchor that is connected to a part of the plurality of enclosure walls; and extending the soda gun hose through a hose opening positioned on a wall of the plurality of enclosure walls such that the soda gun hose extends from an internal space formed by the plurality of enclosure walls to an exterior of the soda gun housing, and such that the soda gun handle is prevented from retracting through the hose opening into the internal space.

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or regions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

What is claimed is:

1. A soda gun housing, comprising:

a plurality of enclosure walls defining an internal space;

a manifold support connected to at least one wall of the plurality of enclosure walls, the manifold support being configured to secure a soda gun manifold to the at least one wall within the internal space;

a retraction component anchor connected to a part of the plurality of enclosure walls, the retraction component anchor being configured to secure a retraction component to the part of the plurality of enclosure walls, wherein the retraction component is connectable to a hose clamp configured to clamp onto a soda gun hose extending from the soda gun manifold secured by the manifold support; and a hose opening positioned on a wall of the plurality of enclosure walls, wherein the hose opening permits the soda gun hose to extend from the internal space to an exterior of the soda gun housing.

2. The soda gun housing of claim 1, wherein the retraction component comprises a tool retractor or an extension spring.

3. The soda gun housing of claim 1, wherein the internal space comprises a hose travel space through which the soda gun hose is configured to travel when changing between extended and retracted configurations.

4. The soda gun housing of claim 1, further comprising one or more hose clips connected to at least part of the plurality of enclosure walls, the one or more hose clips being configured to secure the soda gun hose to at least the part of the plurality of enclosure walls.

5. The soda gun housing of claim 1, further comprising one or more hose supports connected to at least part of the plurality of enclosure walls, the one or more hose supports being configured to support the soda gun hose in a retracted configuration.

6. The soda gun housing of claim 1, wherein the plurality of enclosure walls comprises a first sidewall, a second sidewall, and a top wall.

7. The soda gun housing of claim 6, wherein the top wall comprises a top door that is openable to expose the internal space.

8. The soda gun housing of claim 6, wherein the soda gun housing comprises a backsplash element extending therefrom.

9. The soda gun housing of claim 7, wherein an edge of the top door at least partially defines the hose opening.

10. The soda gun housing of claim 6, wherein the first sidewall or the second sidewall comprises a side door that is openable to expose the internal space.

11. The soda gun housing of claim 6, wherein the plurality of enclosure walls further comprises one or more rear support walls and one or more bottom support walls, wherein the one or more rear support walls at least partially define a rear opening, and wherein the one or more bottom support walls at least partially define a bottom opening.

12. The soda gun housing of claim 1, further comprising a drainage opening positioned on the wall of the plurality of enclosure walls.

13. The soda gun housing of claim 12, further comprising a drainage hose clamp connected to at least part of the plurality of enclosure walls, the drainage hose clamp being configured to secure a drainage hose extending from a drainage catch to at least the part of the plurality of enclosure walls.

14. A retractable soda gun system, comprising:

a soda gun assembly, comprising:

a soda gun manifold;

a soda gun hose extending from the soda gun manifold; and a soda gun handle connected to an end of the soda gun hose; and a soda gun housing, comprising:

a plurality of enclosure walls defining an internal space;

a manifold support connected to at least one wall of the plurality of enclosure walls, the manifold support securing the soda gun manifold to the at least one wall within the internal space;

a retraction component anchor connected to a part of the plurality of enclosure walls, the retraction component anchor securing a retraction component to the part of the plurality of enclosure walls, wherein the retraction component is connected to the soda gun hose; and a hose opening positioned on a wall of the plurality of enclosure walls, wherein the soda gun hose extends from the internal space to an exterior of the soda gun housing through the hose opening.

15. The retractable soda gun system of claim 14, wherein the retraction component comprises a tool retractor or an extension spring.

16. The retractable soda gun system of claim 14, wherein the retractable soda gun system comprises:

a retracted configuration in which the retraction component is retracted to pull the soda gun hose and the soda gun handle into a retracted position; and an extended configuration in which the retraction component is extended to permit the soda gun hose and the soda gun handle to reach one or more extended positions.

17. The retractable soda gun system of claim 16, wherein the internal space comprises a hose travel space through which the soda gun hose is configured to travel when changing between extended and retracted configurations.

18. The retractable soda gun system of claim 16, wherein the soda gun housing further comprises one or more hose supports connected to at least part of the plurality of enclosure walls, the one or more hose supports being configured to support the soda gun hose in the retracted configuration.

19. The retractable soda gun system of claim 14, wherein a spring couple intervenes between the retraction component and the soda gun hose.

20. A method for assembling a retractable soda gun system, the method comprising:

obtaining a soda gun assembly, the soda gun assembly comprising:

a soda gun manifold;

a soda gun hose extending from the soda gun manifold; and a soda gun handle connected to an end of the soda gun hose;

securing the soda gun manifold to a manifold support connected to at least one wall of a plurality of enclosure walls of a soda gun housing;

clamping a hose clamp onto the soda gun hose, wherein the hose clamp is connected to a second end of an extension spring, wherein a first end of the extension spring is secured to an extension spring anchor that is connected to a part of the plurality of enclosure walls; and extending the soda gun hose through a hose opening positioned on a wall of the plurality of enclosure walls such that the soda gun hose extends from an internal space formed by the plurality of enclosure walls to an exterior of the soda gun housing, and such that the soda gun handle is prevented from retracting through the hose opening into the internal space.

* * * * *